Dec. 30, 1958     J. L. BIACH     2,866,370
BOLT-TENSIONING AND NUT-SEATING APPARATUS
Filed Feb. 2, 1956     2 Sheets-Sheet 1
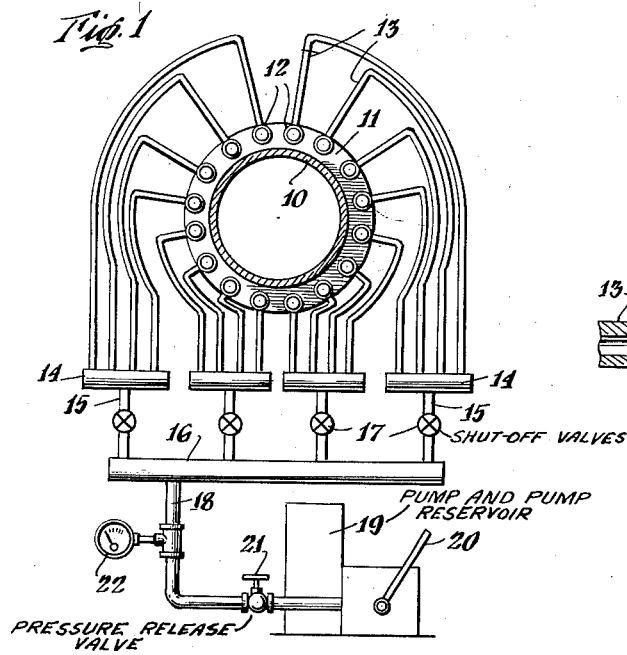
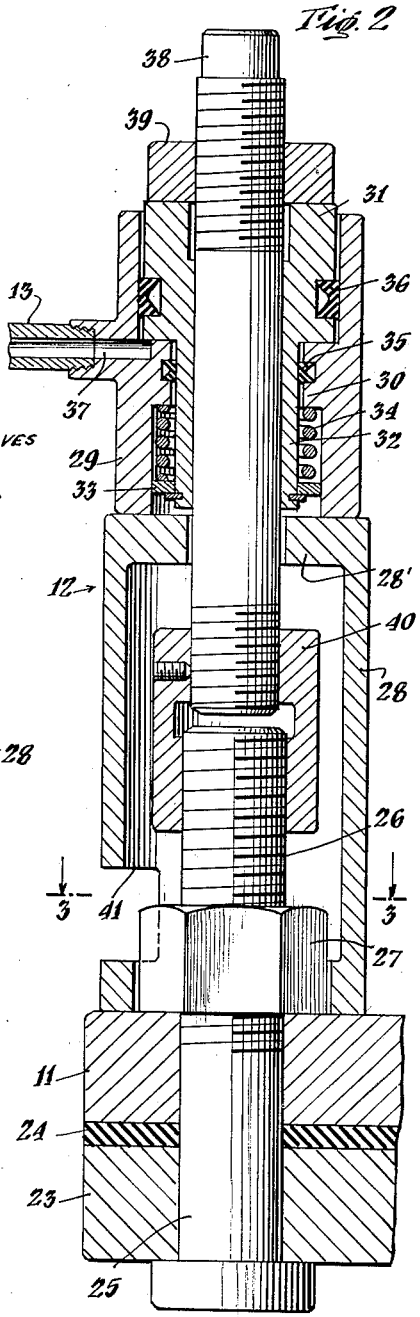
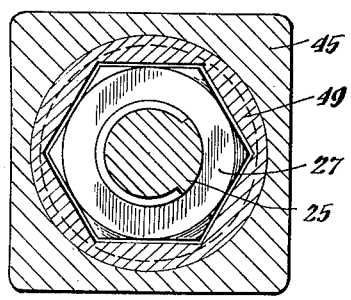
INVENTOR
John L. Biach
BY
Kane, Dalsimer & Kane
ATTORNEYS

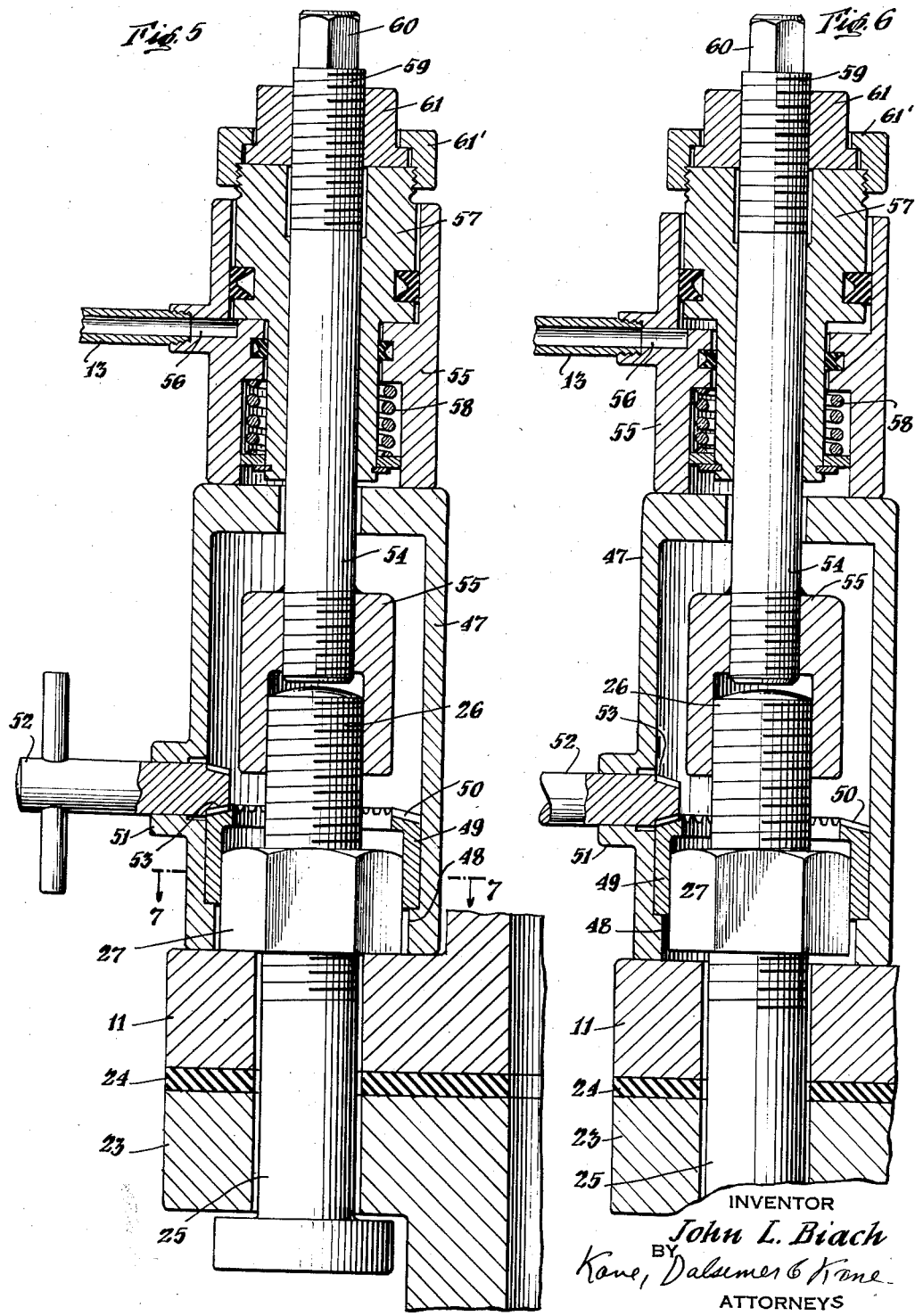

United States Patent Office 2,866,370
Patented Dec. 30, 1958

2,866,370

BOLT-TENSIONING AND NUT-SEATING APPARATUS

John L. Biach, Cranford, N. J.

Application February 2, 1956, Serial No. 563,109

5 Claims. (Cl. 81—54)

It is a well appreciated fact that bolted flanges are used throughout many industries for connecting pipe lines and for making up joints in various pressure vessels. Ordinarily, gaskets are associated with the flanges to assure of a leak-proof connection. Such a connection is not difficult to establish where relatively low pressures are involved. However, in the case of high pressures, great difficulties have been experienced.

The unfired pressure vessel code specifies very precise methods for calculating the proper bolting in order to obtain a safe and tight joint. However, that joint is established by workmen using torque wrenches. Even an experienced mechanic using proper tools can at best only approximate the required and proper tension. This occurs because in practice one bolt may be relatively rusty while an adjacent bolt is substantially clean and oily. Therefore, equal torque on a nut which is being mounted will not produce equal tension on all bolts. All bolts have to be tightened gradually and equally. Having in mind that certain flanges have sixty-four or more bolts, the procedure involves an expensive and time-consuming process.

By means of the present teachings, absolute uniform tightening of the bolts or studs in a given series is simultaneously achieved and the resultant tension is of the desired value.

An additional object of this invention is that of teaching a method which may readily be practiced by relatively unskilled workmen and as a result of which the foregoing effect is achieved.

Still another object is that of furnishing an apparatus embracing relatively few parts, each individually simple and rugged in construction; such parts being capable of ready assembly to furnish a unitary mechanism operating over long periods of time with freedom from all difficulties.

With these and other objects in mind, reference is had to the attached sheets of drawings illustrating practical embodiments of the invention, and in which:

Fig. 1 is a schematic layout of the apparatus applied to a flange structure involving a series of bolts;

Fig. 2 is a sectional side view of one form of unit embraced within the apparatus;

Fig. 3 is a sectional plan view taken along the line 3—3 in the direction of the arrows as indicated in Fig. 2;

Fig. 4 is a fragmentary sectional view of an alternative form of structure which may be employed;

Fig. 5 is a view similar to Fig. 2 but showing another alternative form of apparatus;

Fig. 6 corresponds to Fig. 5 but illustrates the position which the parts assume under the application of tension; and Fig. 7 is a sectional plan view taken along the line 7—7 in the direction of the arrows as indicated in Fig. 5.

Referring primarily to Fig. 1 in which in somewhat schematic manner a complete layout of apparatus has been illustrated, the numeral 10 indicates a hollow member such as a pipe provided with a flange 11. Extending through openings in this flange are bolts which, together with nuts, serve to maintain the flange in a desired position and condition with respect to an adjacent flange or other mounting surface. These bolts and nuts are each ensleeved by units generally indicated at 12. Extending from each of these units are pressure lines or tubes 13 conveniently connected in groups of four to manifolds 14. The latter are, in turn, connected by lines 15 to for example a base manifold 16 and control valves 17 may be interposed within each of lines 15. It will, of course, be understood that according to the number of bolts to be tensioned and nuts to be seated, further manifolds or equivalent fluid-distributing structures may be employed or a lesser number may be utilized. It will be assumed that in a given installation, equal tension is to be applied to the several bolts. To this end, the areas of the power transmitting surfaces of the several units 12 are equal in value. Obviously, if tensions of different values are to be applied, then differential areas might be employed or pressure controlling units might be associated with at least certain of the lines to obtain the desired results.

In any event, if manifolds are employed, then a line such as 18 will connect manifold 16 with a pump assembly 19 including a reservoir. That assembly may embody any desired construction, but is preferably actuated by a manually-operable element such as 20. While different fluids could be employed, it is also definitely preferred to utilize a hydraulic liquid which will be transmitted from the pump through line 18, manifold 16, lines 15, manifolds 14 and lines such as 13. A pressure release valve 21 may be included in the pump assembly or adjacent thereto. Also, a pressure indicator such as 22 is disposed adjacent that assembly. It has been found that with employing hydraulic liquids and a manually-operable pump, tensions may be imparted to the bolts to create stresses in excess of 30,000 pounds per square inch.

Referring to Fig. 2, the numeral 11 indicates the flange as heretofore described. 23 designates an adjacent flange which is to be drawn into intimate contact therewith. Between these flanges a gasket or layer of sealing material 24 may be interposed. Bolts such as 25 either extend through openings in both of the flanges or else are fixed against displacement with respect to flange 23 and extend through an opening in flange 11 to a point well above the mounting or bearing surface of the latter. These bolts, in accordance with conventional practice, are formed with threads 26. Displacement of a bolt with respect to a mounting member such as a flange 11 is prevented by nuts 27 mounted on the threads 26. So mounted, these nuts will bear against the adjacent surface of flange 11 or its equivalent and exert stresses upon bolts 25 to a value such that the latter will be properly tensioned and the sealing ring 24 compressed to assure against leakage. In the case of most commercial installations, such assurance is obtained only by subjecting each of the bolts 25 of a series to equal tension.

The detailed construction of one of the units generally indicated at 12 embraces, in Fig. 2, a tubular casing 28 which is preferably flanged inwardly adjacent its upper end, as at 28′ and bears adjacent its opposite end against the surface of flange 11. A cylinder unit in the form of a tube 29 is mounted upon the upper end of casing or housing 28 and has an inwardly-extending flange portion 30 restricting an area of its bore. Within that bore, a member is disposed which as illustrated, embraces a piston head 31 and a shank portion 32. This member is tubular and mounts, adjacent its lower end, a retaining ring 33. Against the latter, one end of an expansion spring 34 bears; the opposite end of that spring thrusting against the underface of flange 30. This flange or extension is grooved to receive a packing material in the form of a ring 35. The outer face of head portion 31 is similarly grooved and receives a ring or assembly 36 of packing material. A passage 37 is preferably formed through the side wall of cylinder member 29 at a point adjacent the upper surface of inwardly-extending flange portion 30. This passage connects with one of the lines 13.

A rod 38 has its upper end threaded to mount thereon a nut 39. That nut bears against the upper surface of piston head 31. The lower end of the rod has fixedly secured to it a cap or nut 40. The latter defines an opening equal to the diameter of the adjacent end of bolt 25 and is threaded to engage the threads 26 thereof. In this form of apparatus, tube 28 is conveniently formed with an opening or window 41 adjacent its lower end. As shown in Fig. 3, this opening may extend throughout a substantial area of the tube. It permits of a suitable wrench 42 being introduced into the interior of the thrust-transmitting member 28 to engage the outer faces of nuts 27 for the purpose of turning the latter.

As afore brought out, cap or nut 40 is fixed against movement with respect to rod 38. This result may be achieved in any desired manner as, for example, by welding. So secured, it would be necessary to employ either separate units 12 for different diameter bolts 25 or else to utilize different rod and nut assemblies 38—40 in the case of units being placed in operative association with different sized bolts. However, it is feasible to adopt a suitable structure permitting of the detachment of a cap or nut 40 from a rod 38 and a replacement thereon of a nut having a larger or smaller bolt-accommodating opening. This has been illustrated somewhat schematically in Fig. 4, in which the numeral 43 indicates a threaded rod corresponding to rod 38. This rod will have its threads interrupted by a groove 44. It will mount a nut 45 corresponding to nut or cap 40. The latter may also have threads in its bore for cooperation with threads 43; the threads of this cap being likewise interrupted. A key 46 may be inserted into the grooves formed in bolt 43 and nut 45 when those grooves are brought into alignment and after the cap has been properly mounted upon the rod. This will secure the nut 45 against turning with respect to that rod. Accordingly, when the latter is rotated, nut 45 will also rotate. By embodying different size bores in the lower ends of nuts 45, they may cooperate with bolts of different diameters.

Considering the operation of the apparatus so far described, and assuming that flanges such as 23 and 11 are to be coupled with a layer 24 in the form of a ring or gasket interposed between the same, bolts 25 suitably associated with flange 23 will extend ordinarily through openings in the layer 24. They will also extend through openings in the flange 11, to points well beyond the surface of the latter. Housing 28 will be ensleeved over the threaded end 26 of bolt 25. That housing may have associated with it the nut 27. Otherwise, the nut will have been previously mounted on the bolt 25 to a point where it is, for example, "finger tight." In any event, with housing 28 in position, cap or nut 40 is caused to rotate so that it engages with the thread 26 at a point beyond nut 27. As will be understood, mere turning of the rod 38 by digital force is all that is necessary to achieve this result. As afore brought out and as shown in Fig. 1, each of the bolts is ensleeved in this manner and has its threads coupled to a cap 40 or the equivalent thereof.

Now the hydraulic cylinder is applied as part of the assembly by passing rod 38 up through the bore of piston member 31—32 so that its upper end extends well above the piston head 31. Nut 39 is mounted on the exposed threads of rod 38. Again it will be appreciated that in such mounting, no special tool will be necessary in that merely a finger thrust will be adequate. Under these circumstances, piston head portion 31 will rest against flange 30 under the influence of spring 34 as shown in this view. If, now, the pump 19 or its equivalent is operated and with valve 17 open, liquid will flow from each of the lines 13 through the passages 37 into the interior of the units 12. So flowing, its escape will be prevented by the rings 35 and 36.

Accordingly, under the action of the hydraulic liquid, a thrust will be transmitted against cylinder 29 to housing 28 and thence to the surface of mounting member 11. Likewise, a thrust will be transmitted to piston head portion 31. That part being secured against axial movement in an upward direction, with respect to rod 38, will cause the latter to rise. The lower end of the rod being connected by the cap or nut 40 to bolt 25 will exert tension on the latter. When the pressure of the liquid registers a proper value on gauge 22, or when that value has been otherwise determined, it will be found that each of the bolts is under proper tension. Therefore, a relatively unskilled workman may introduce a wrench such as 42 through the openings 41 and engage the surfaces of nuts 27. When the inner faces of the latter engage against flange 11, further tightening may be interrupted.

With this procedure followed throughout the series of bolts, it will be found that a proper seal has been established with each bolt and nut assembly under substantially identical conditions of strain. Thereupon, valve 21 may be manipulated to release the pressure. With such release, a return flow of liquid through passages 37 into lines 13 will occur incident to the back pressure imposed by springs 34, which are preferably employed. Now, by simply turning each rod 38, the threads of cap 40 may be disengaged from the threads 26 of bolt 25. When these parts are thus freed, housing 28 may simply be shifted beyond the end of bolt 25. The coupling will now be complete with an equal tension throughout the area of the entire flange or other mounting surface. Therefore, with minimum effort and expenditure of time, an entirely satisfactory joint is obtained.

In lieu of the specific structure shown in Fig. 2, various other assemblies may be employed. In this connection, attention is invited to Figs. 5, 6 and 7. In those views, the numeral 47 indicates housings corresponding to the housing 28 and which are preferably formed adjacent their lower ends with inwardly extending flanges 48. These provide rests for caps or wrenches 49 having internal configurations corresponding to those of the nuts 27 to be seated. As in the corresponding numerals in previous views, the numbers 11 and 23 indicate flange portions between which there is interposed a layer 24 of packing material. Mounted upon the shank or stem of bolt 25 is a nut 27. That stem is also provided with threads 26. Especially as shown in Fig. 5, the illustration includes a bolt 25 not fixed with respect to flange 23.

Accordingly, a head is included in that element and which head underlies flange 23. As illustrated especially in Fig. 5, in an exaggerated manner, the head portion of the bolt is shown as spaced from the under-face of flange 23. This represents a condition which may obtain when nut 27 has merely been tightened by the fingers of the operator and prior to the application of tension on the bolt. Under normal conditions, the head, however, will be in substantial contact with its under-face against the adjacent surface of flange 23. The wrench or socket 49 has its inner face conforming to the surfaces of nut 27. Its upper edge conveniently furnishes an annular series of teeth 50. Housing 47 is provided with an opening defined by a boss 51. Through this opening, a wrench 52 may have its end inserted. This wrench is formed with a series of teeth which mesh with teeth 53.

The upper end of housing 47 is conveniently formed with an inwardly extending flange through which a rod 54 corresponding to rod 38 extends. That rod has attached to its lower end a cap or nut 55 internally threaded to engage the threads 26 of bolt 25. As is apparent, a detachable connection might be provided between these parts in order to achieve the function inherent in the structure illustrated in Fig. 4. A cylinder 55, generally embracing the structure included within unit 29 of Fig. 2, is mounted upon housing 47. Within the bore of this cylinder, a piston 57 is reciprocable and preferably urged in a predetermined direction by means of a spring 58. An inlet 56 is also provided for connection with one of the hydraulic lines 13. A rod 54 terminates in a threaded upper zone 59, beyond which a non-circular portion 60 may be provided. The latter extends above a nut 61 which engages the threads 59. This nut is secured against displacement by a retaining ring 61' having threaded or other suitable connection with the piston assembly 57.

The procedure in connection with apparatus of the specific type shown in these figures will be substantially identical with that heretofore described in connection with Fig. 2. In other words nut 27 will be tightened either by the fingers of the mechanic or by the use of a wrench capable of merely exerting a relatively slight leverage. The unit having been ensleeved over the end of bolt stem 25 with the threads 26 of the latter engaged with the threads of cap or nut 55, it follows that with the application of pressure within the interior of the cylinder, piston 57 will be caused to rise. So moving, it will shift rod 54 upwardly. The turning of that rod in order to couple cap 55 with threads 26 will have been facilitated by the provision of the non-circular portion 60. In any event, with rod 54 moving upwardly, a stress will be transmitted to bolt 25. Whether or not the latter extends freely through flange 23, that bolt will be subjected to a tension such that nut 27 will be moved out of contact with the adjacent surface of mounting member 11 as shown in Fig. 6. Thereupon, by coupling the end 53 of wrench 52 with the wrench or socket 49, the latter may be turned. So turning, the nut 27 will be caused to rotate until its under surface bears against the adjacent face of mounting member 11.

It is to be emphasized that this tightening of the nut will not require the exercise of any force other than minimal. So long as a firm bearing contact between the nut and the flange 11 or its equivalent has occurred, a proper relationship will have been set up. Thereupon, by operating the release valve 21, the hydraulic pressure will be relieved and under the influence of spring 58, the parts will return to their initial position. Ordinarily a unit of this type will handle a certain variation in bolt dimensions. For example, from 7/8" through to 1¼" diameters might be accommodated. For larger and smaller sizes, it will be desirable to provide correspondingly dimensioned units. In this connection, it is to be borne in mind that a unit should cooperate solely with one bolt and nut assembly and not interfere with adjacent assemblies, to all of which units are applied so that a complete seat is simultaneously provided in connection, for example, with an entire annular series of bolts associated with a pipe flange.

Thus among others, the several objects of the invention as specifically aforenoted are achieved. It is obvious that changes in structure might be resorted to without departing from the spirit of the invention as defined by the claims.

I claim:

1. A bolt tensioning and nut seating apparatus including in combination a housing to be applied to a mounting member from which a bolt supporting a nut extends, a rod supported by said housing, a piston connected to said rod, a cylinder connected to said housing and enclosing said piston, means connecting said rod with said bolt at a point beyond that at which it mounts the nut for tensioning said bolt as said piston and rod are shifted and said housing being formed with an opening through which a wrench may be introduced to engage said nut.

2. A bolt-tensioning and nut-seating apparatus including in combination a housing to be applied to a mounting member from which a bolt supporting a nut extends, a rod disposed within and extending above said housing, a cylinder comprising a fixed tube bearing against the upper end of said housing, the upper end of said tube providing a cylinder having an opening for the passage of fluid, a piston reciprocable within said cylinder and formed with an opening through which said rod extends, means above the piston and bearing against an upper surface thereof for connecting the rod therewith and an apparatus nut carried by the rod within said housing and connectible with said bolt for tensioning the latter as said piston and rod are moved.

3. In an apparatus as defined in claim 2, the lower end of said tube providing a space, a spring having an upper end bearing against a surface of said space within the tube and means connecting the lower end of said spring with said rod to urge the latter and said piston in a downward direction with respect to said housing.

4. In an apparatus as defined in claim 3, the connecting means between the lower spring end and said rod comprising a shank forming a part of said piston and extending into the lower end of said tube and means connecting the lower spring end with said shank.

5. In an apparatus as defined in claim 2, and said housing being formed with an opening adjacent its lower end and said opening having an area such that a wrench is introducible therethrough into engagement with the surfaces of the supported nut.

References Cited in the file of this patent

UNITED STATES PATENTS

| | | |
|---|---|---|
| 1,442,536 | Olhasso et al. | Jan. 16, 1923 |
| 1,677,178 | Fay | July 17, 1928 |
| 1,747,672 | Jeffrey | Feb. 18, 1930 |
| 2,631,485 | Stuart et al. | Mar. 17, 1953 |
| 2,691,314 | Stevens et al. | Oct. 12, 1954 |
| 2,720,803 | Rise et al. | Oct. 18, 1955 |
| 2,736,219 | May | Feb. 28, 1956 |
| 2,756,622 | La Belle | July 31, 1956 |
| 2,760,393 | Stough | Aug. 28, 1956 |
| 2,781,682 | Herndon | Feb. 19, 1957 |